(12) United States Patent
Hayashi et al.

(10) Patent No.: US 11,531,188 B2
(45) Date of Patent: Dec. 20, 2022

(54) IMAGING OPTICS AND IMAGING DEVICE INCLUDING SEVEN LENSES OF -++-++- OR -+-+-REFRACTIVE POWERS

(71) Applicant: TAMRON CO., LTD., Saitama (JP)

(72) Inventors: Toshihide Hayashi, Saitama (JP); Koichiro Yokota, Saitama (JP); Takayuki Noda, Saitama (JP)

(73) Assignee: TAMRON CO., LTD., Saitama (JP)

( * ) Notice: Subject to any disclaimer, the term of this patent is extended or adjusted under 35 U.S.C. 154(b) by 466 days.

(21) Appl. No.: 16/716,715

(22) Filed: Dec. 17, 2019

(65) Prior Publication Data

US 2020/0355889 A1 Nov. 12, 2020

(30) Foreign Application Priority Data

May 10, 2019 (JP) .............................. JP2019-089985

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 2013/0271851 | A1 | 10/2013 | Souma |
| 2016/0085054 | A1 | 3/2016 | Asami |
| 2017/0184821 | A1 | 6/2017 | Shi |

FOREIGN PATENT DOCUMENTS

| JP | 2013-235239 A | 11/2013 |
| JP | 2016-62021 A | 4/2016 |
| JP | 2017-116913 A | 6/2017 |

*Primary Examiner* — Wen Huang
(74) *Attorney, Agent, or Firm* — WHDA, LLP

(57) ABSTRACT

An imaging optics including, in sequence starting from the object side, of a 1st lens G1 with a negative refractive power, a 2nd lens G2 with a positive refractive power, a 3rd lens G3 with a positive refractive power, and a 4th lens G4, a 5th lens G5, a 6th lens G6, and a 7th lens G7 with a negative refractive power, satisfying the conditional expressions.

15 Claims, 11 Drawing Sheets

IMAGING OPTICS AND IMAGING DEVICE INCLUDING SEVEN LENSES OF -++-++- OR -++-+-REFRACTIVE POWERS

FIELD OF INVENTION

The present invention pertains to an imaging optics and an imaging device equipped with the imaging optics.

BACKGROUND ART

In recent years, with the increasingly high precision picture quality of imaging devices, the desire has grown for greater density of imaging elements and greater optical performance from the imaging optics.

On the other hand, the imaging optics is now built into mobile phones, compact drones, and the like, and there is a strong demand to reduce length in the optical axis direction while maintaining high optical performance, i.e., to shorten overall optical length, which indicates the distance from an object side first surface to the imaging surface, and to reduce diameters.

Conventional proposals for the imaging optics have included those with seven lenses: negative, positive, positive, negative, positive, positive, negative (e.g., see Patent Document 1).

Conventional proposals for the imaging optics have also included those with seven lens: negative, positive, positive, negative, negative, positive, negative (e.g., see Patent Document 2).

In addition, as yet another configuration of a conventional compact imaging optics with superior optical performance, a macro lens constituted by three lens groups, positive, positive, and negative, has been proposed; when focusing, a first lens group 11 and third lens group 13 are fixed, while a second lens group 12 is moved (e.g., see Patent Document 3).

PATENT DOCUMENTS

Patent Document 1: JP-A-2016-62021
Patent Document 2: JP-A-2017-116913
Patent Document 3: JP-A-2013-235239

SUMMARY OF THE INVENTION

In the above-described conventional art, the placement of refractive power is not appropriate and thus has the problem that size reduction or performance improvement are insufficient in the lens configuration proposed in Patent Documents 1 and 2.

In the macro lens proposed in Patent Document 3, because of the poor refractive power of the second lens group, which is a focusing lens, requires a large amount of movement of the second lens group when focusing, and thus has the problem of long overall optical length due to the need for air space.

The present invention was undertaken in light of the above-described problems with conventional imaging optics, and has the primary object of providing compact imaging optics with superior optical performance, and an imaging device comprising same.

The imaging optics in one aspect of the invention is comprised, in sequence starting from the object side, of a 1st lens G1 with a negative refractive power, a 2nd lens G2 with a positive refractive power, a 3rd lens G3 with a positive refractive power, and a 4th lens G4, a 5th lens G5, a 6th lens G6, and a 7th lens G7 with a negative refractive power, and satisfies the following conditional expressions $$0.50 \leq f2/f \leq 1.15 \tag{1-1}$$

$$0.38 \leq f3/f \leq 1.10 \tag{1-2}$$

$$0.015 \leq thi\_max/oal \leq 0.210 \tag{1-3}$$

Where:
f: focal length of the imaging optics
f2: focal length of the 2nd lens G2
f3: focal length of the 3rd lens G3
thi_max: maximum lens spacing excluding back focal length
oal: optical length of the imaging optics from the object side surface of the 1st lens G1 to imaging surface.

An imaging device according an aspect of the invention comprises the imaging optics and an imaging element disposed in the imaging position of the imaging optics.

The present invention of this type has superior optical performance and provides compact imaging optics and an imaging device comprising same.

EMBODIMENT OF THE INVENTION

Figure 1:
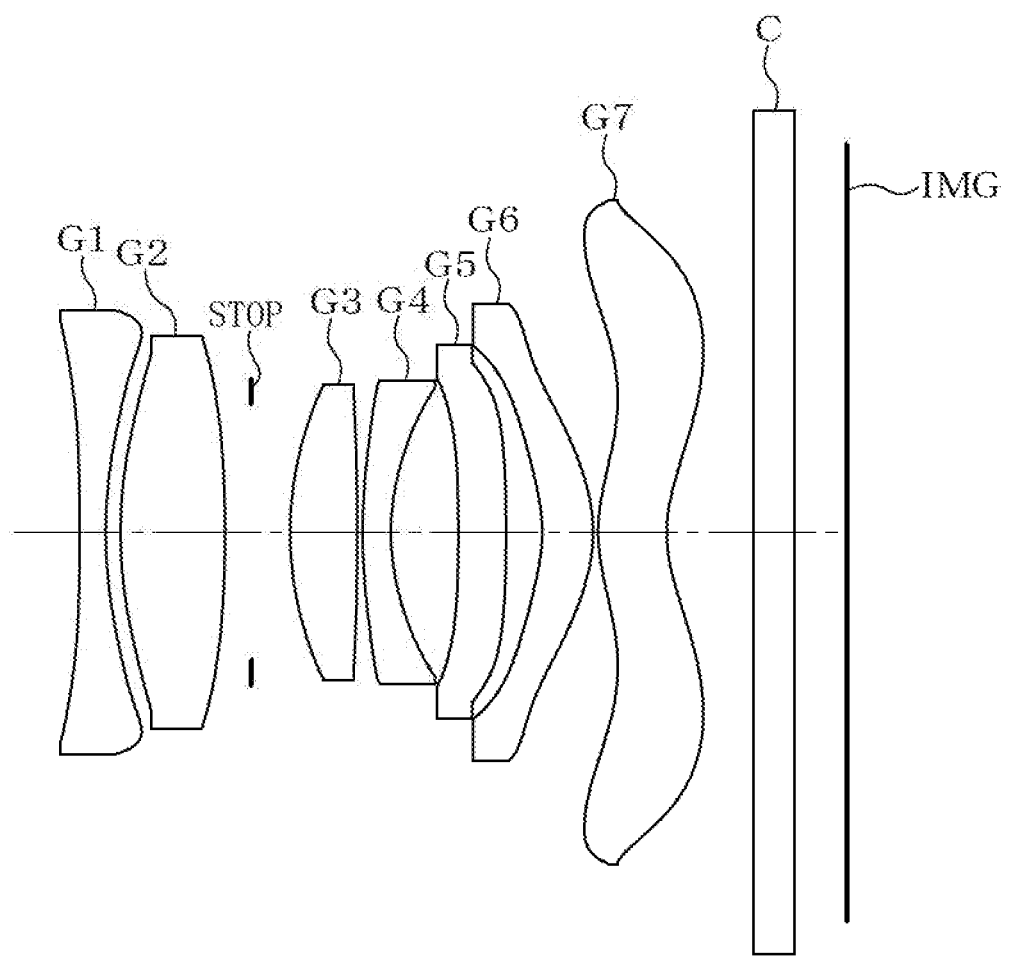
FIG. 1 is a diagram for the first embodiment of the imaging optics according to the present invention.
Figure 2:
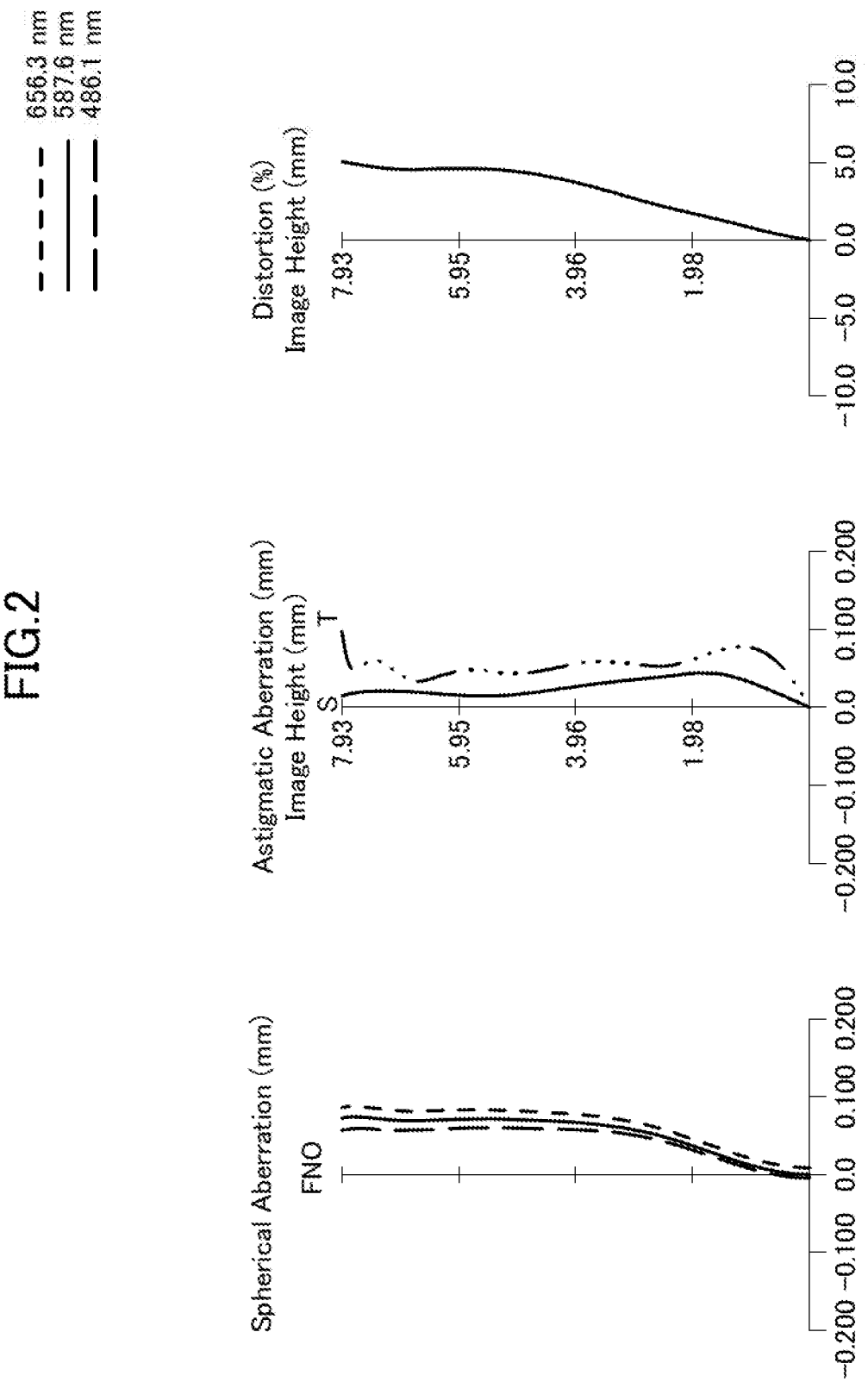
FIG. 2 is an aberration diagram for the first embodiment of the imaging optics according to the present invention.
Figure 3:
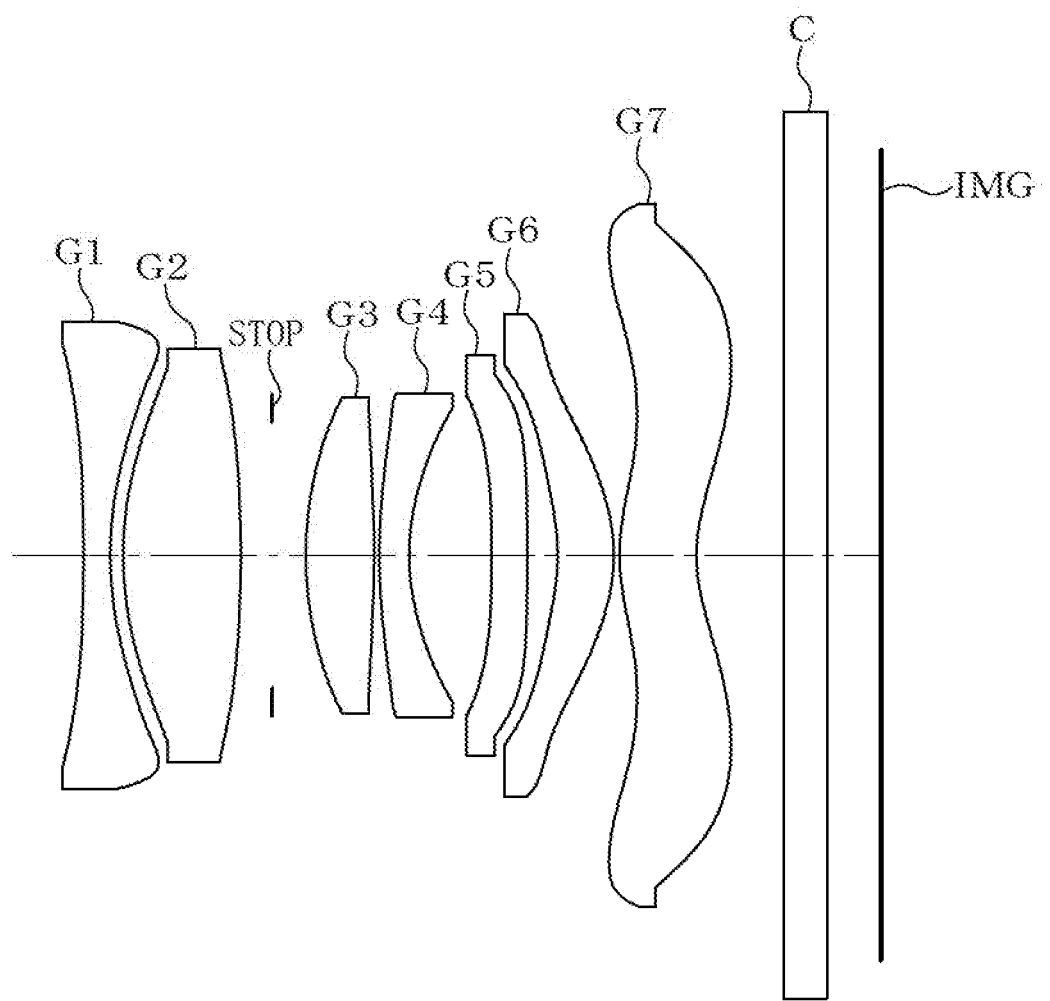
FIG. 3 is a diagram for the second embodiment of the imaging optics according to the present invention.
Figure 4:
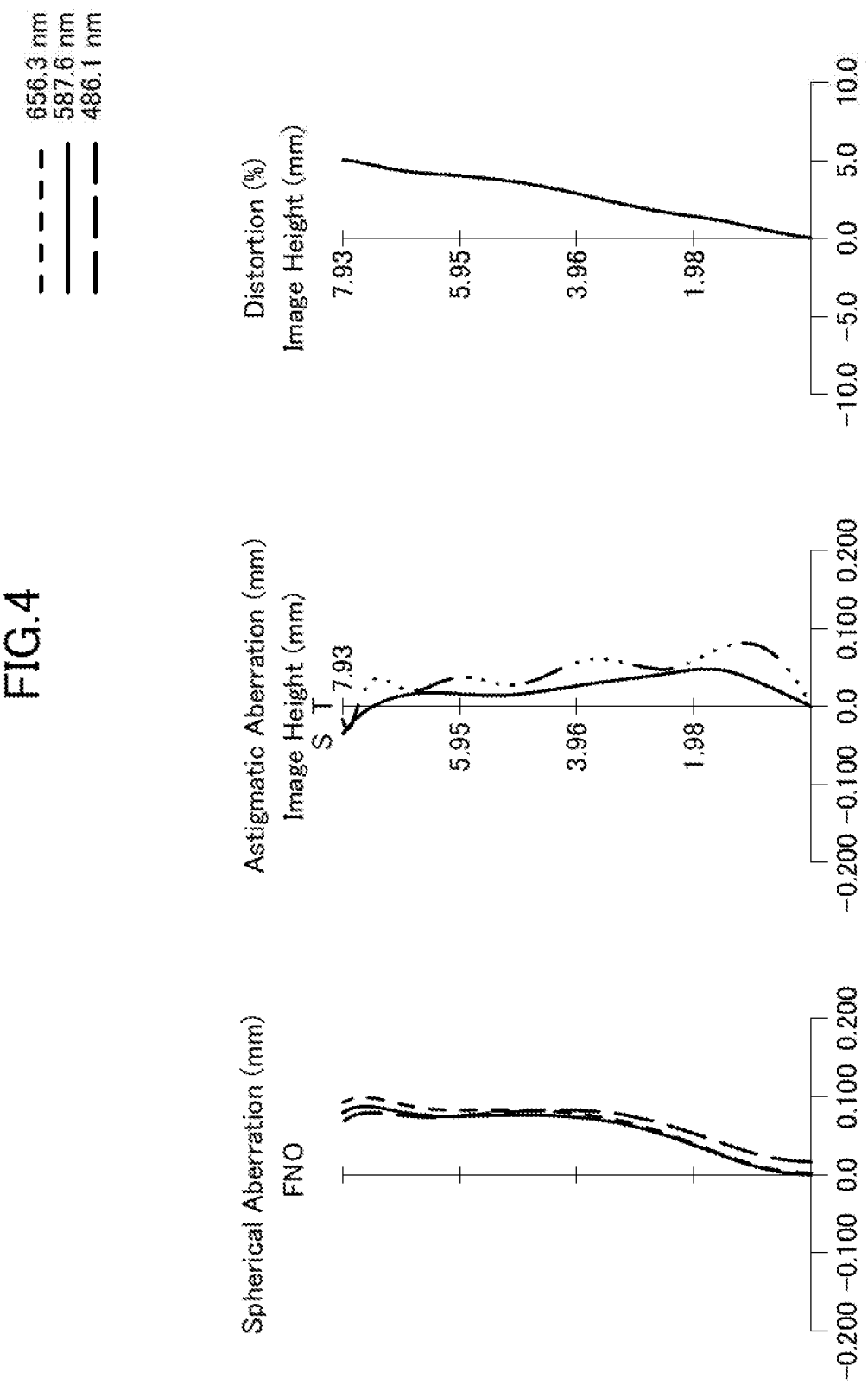
FIG. 4 is an aberration diagram for the second embodiment of the imaging optics according to the present invention.
Figure 5:
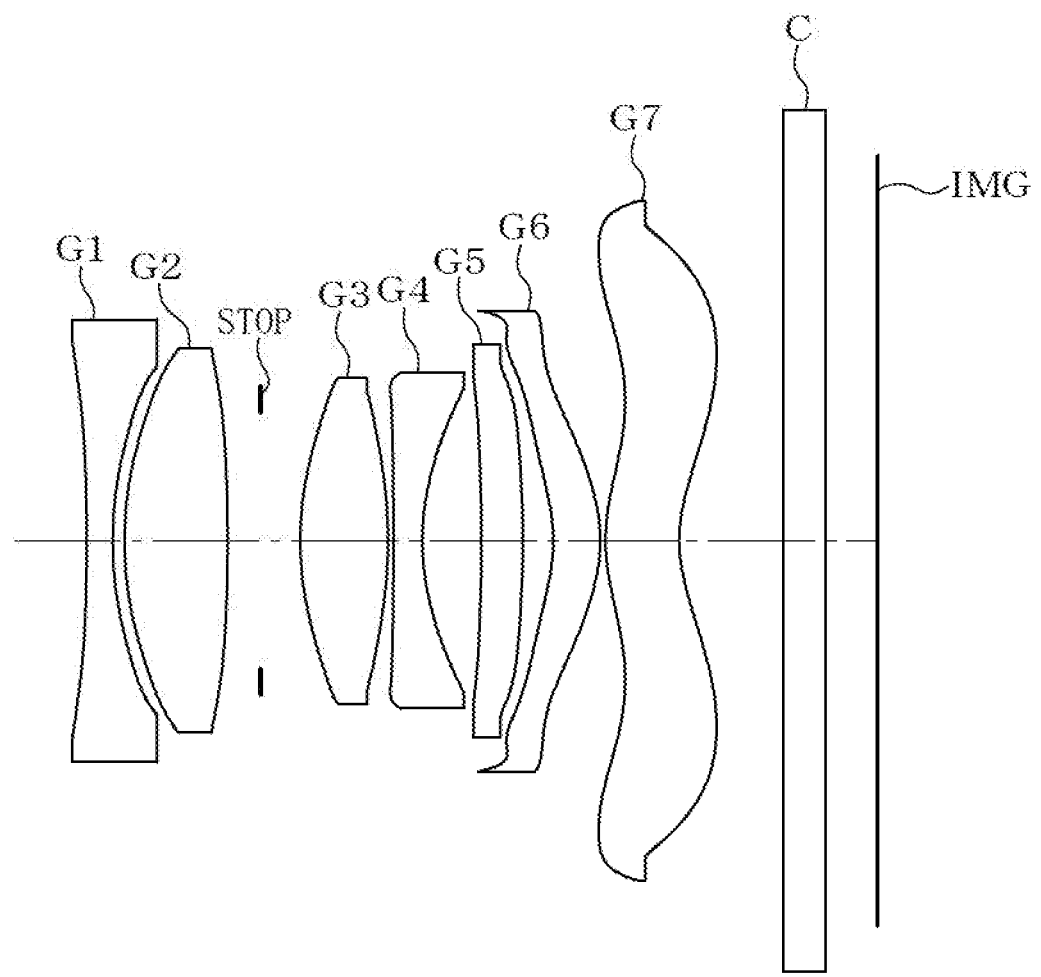
FIG. 5 is a diagram for the third embodiment of the imaging optics according to the present invention.
Figure 6:
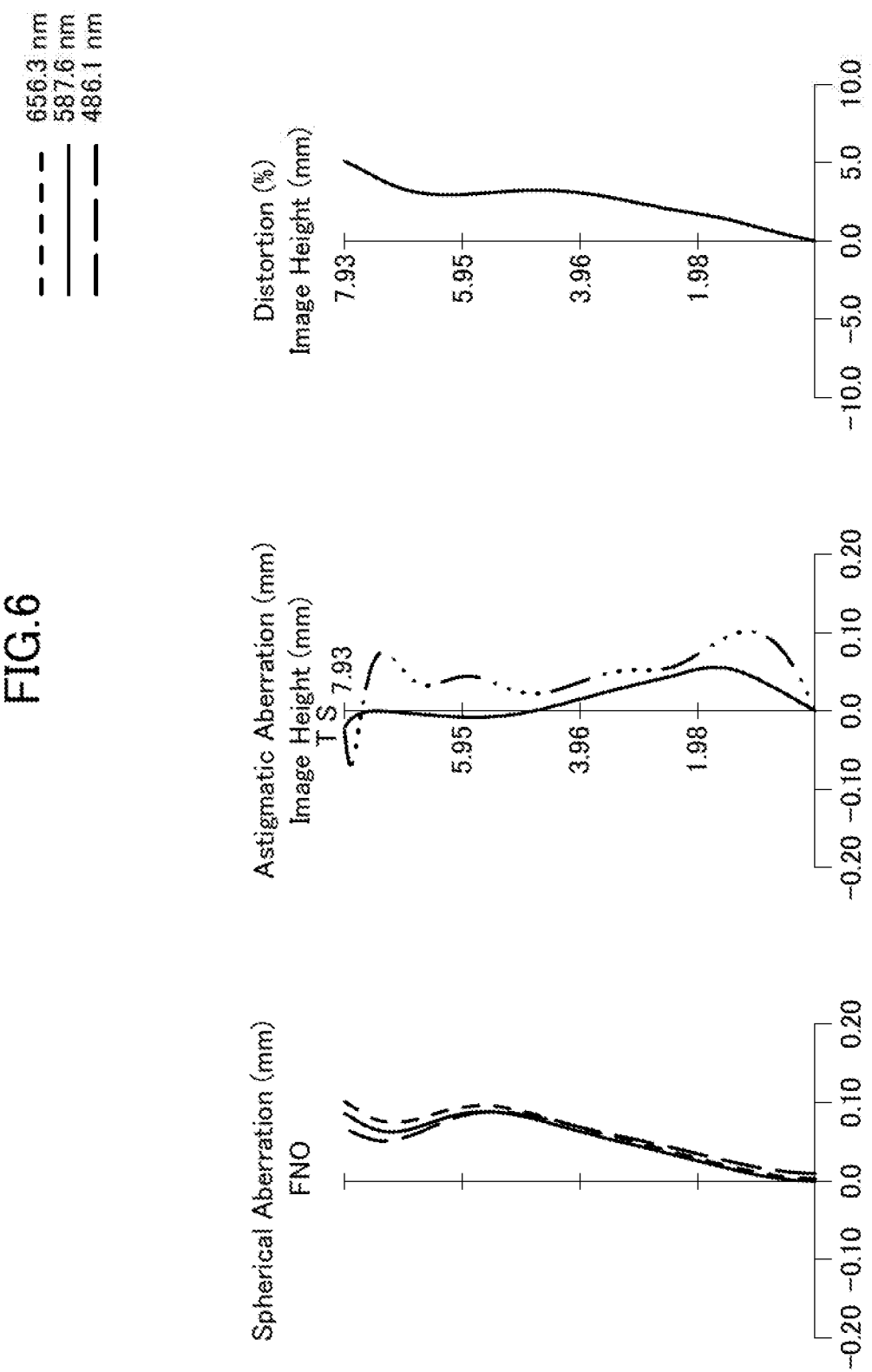
FIG. 6 is an aberration diagram for the third embodiment of the imaging optics according to of the present invention.
Figure 7:
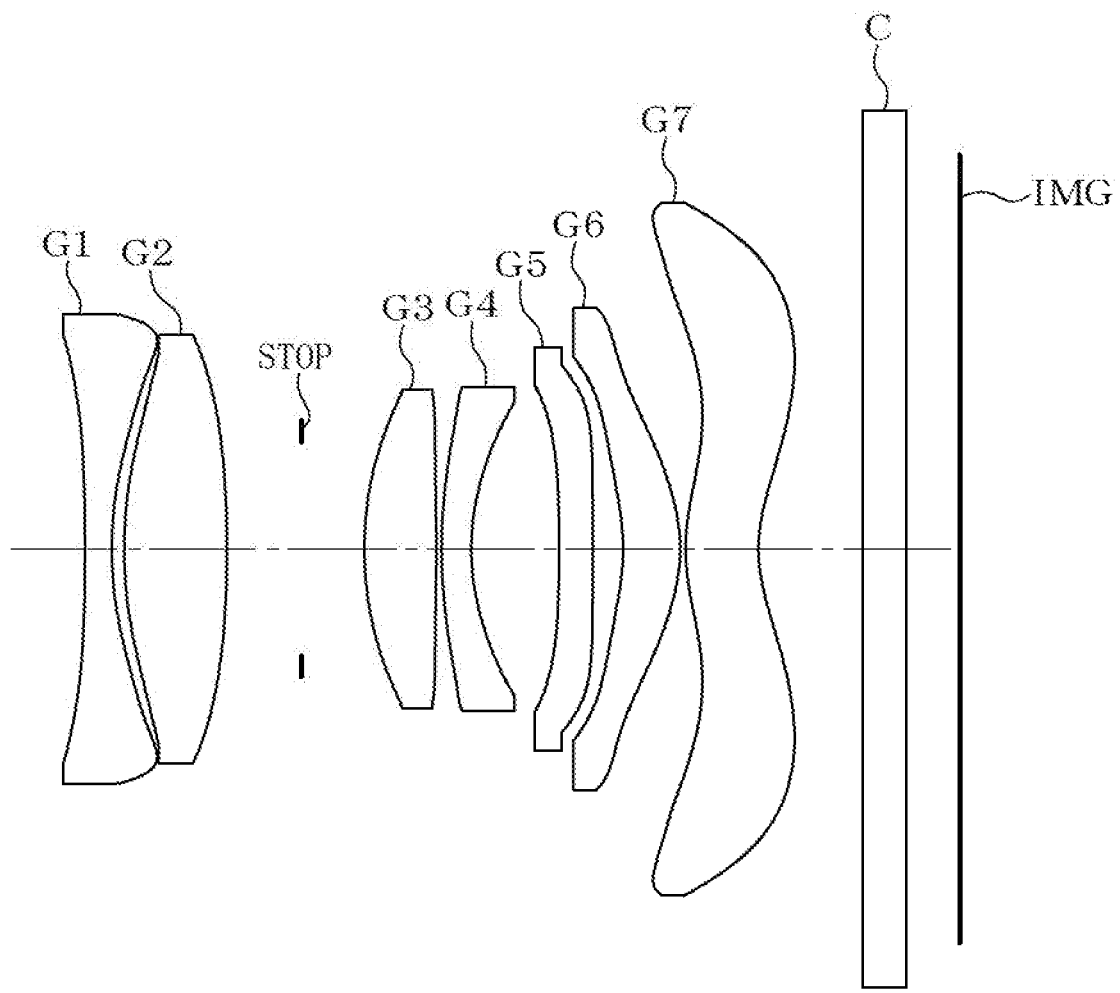
FIG. 7 is a diagram for the fourth embodiment of the imaging optics according to the present invention.
Figure 8:
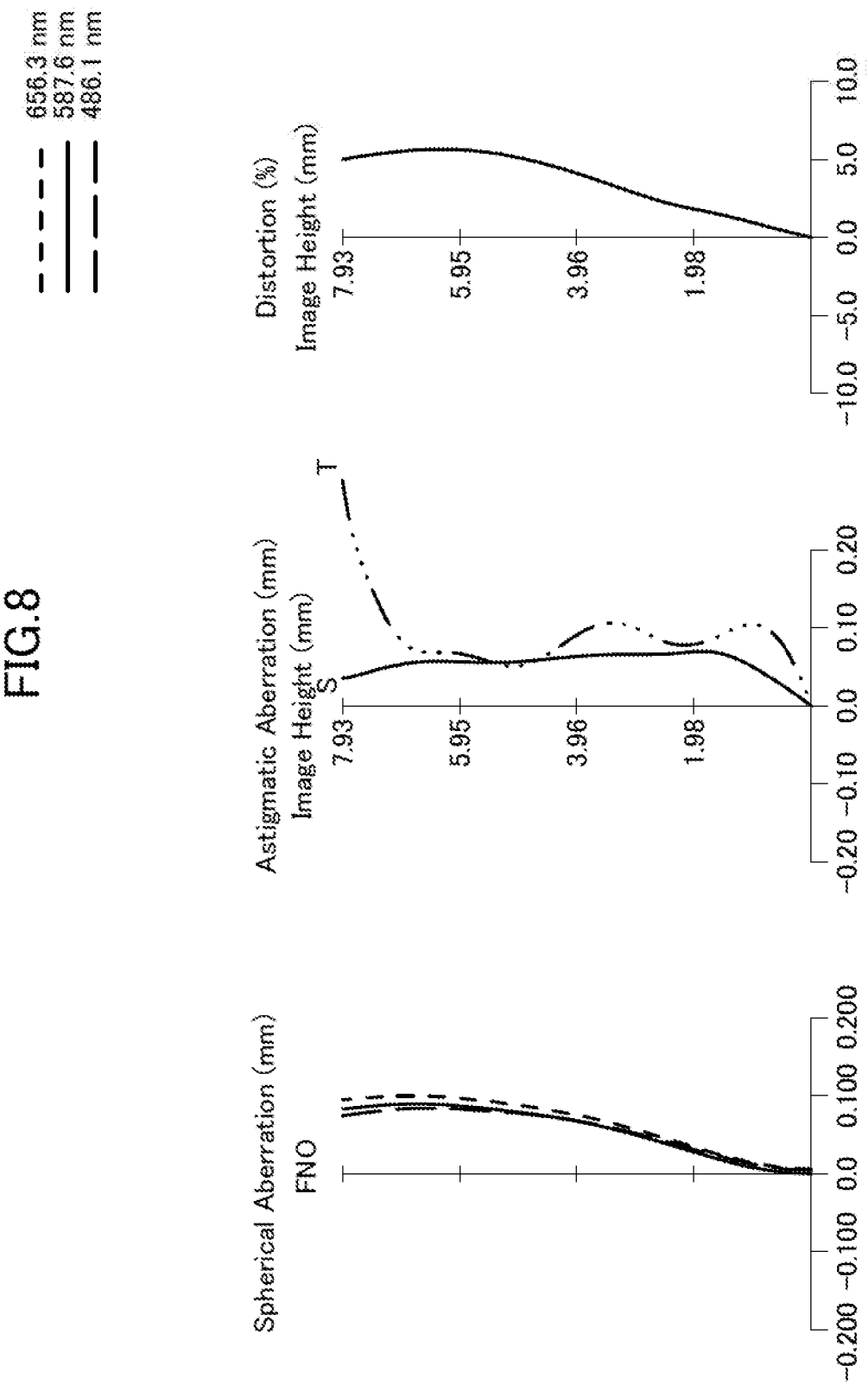
FIG. 8 is an aberration diagram for the fourth embodiment of the imaging optics according to the present invention.
Figure 9:
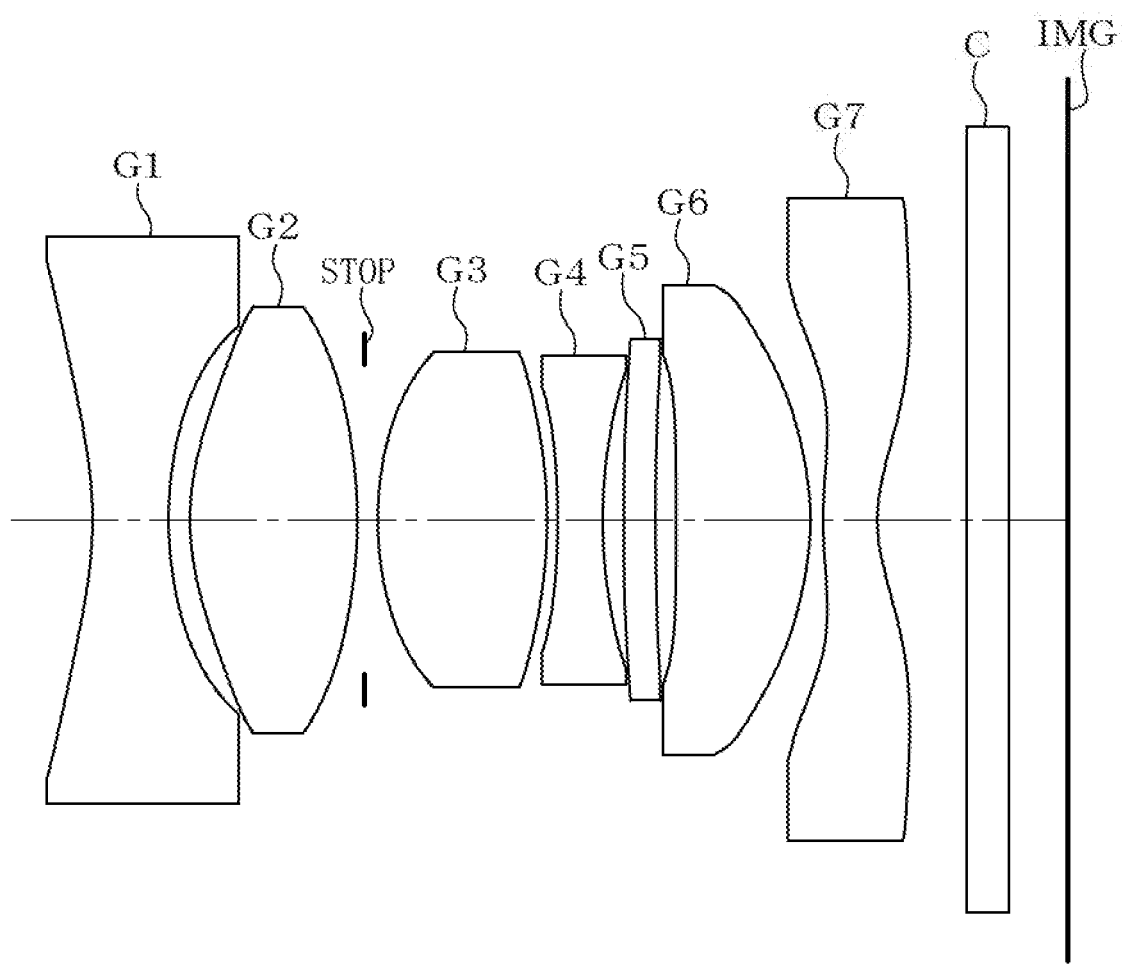
FIG. 9 is a diagram for the lens constitution for the fifth embodiment of the imaging optics according to the present invention.
Figure 10:
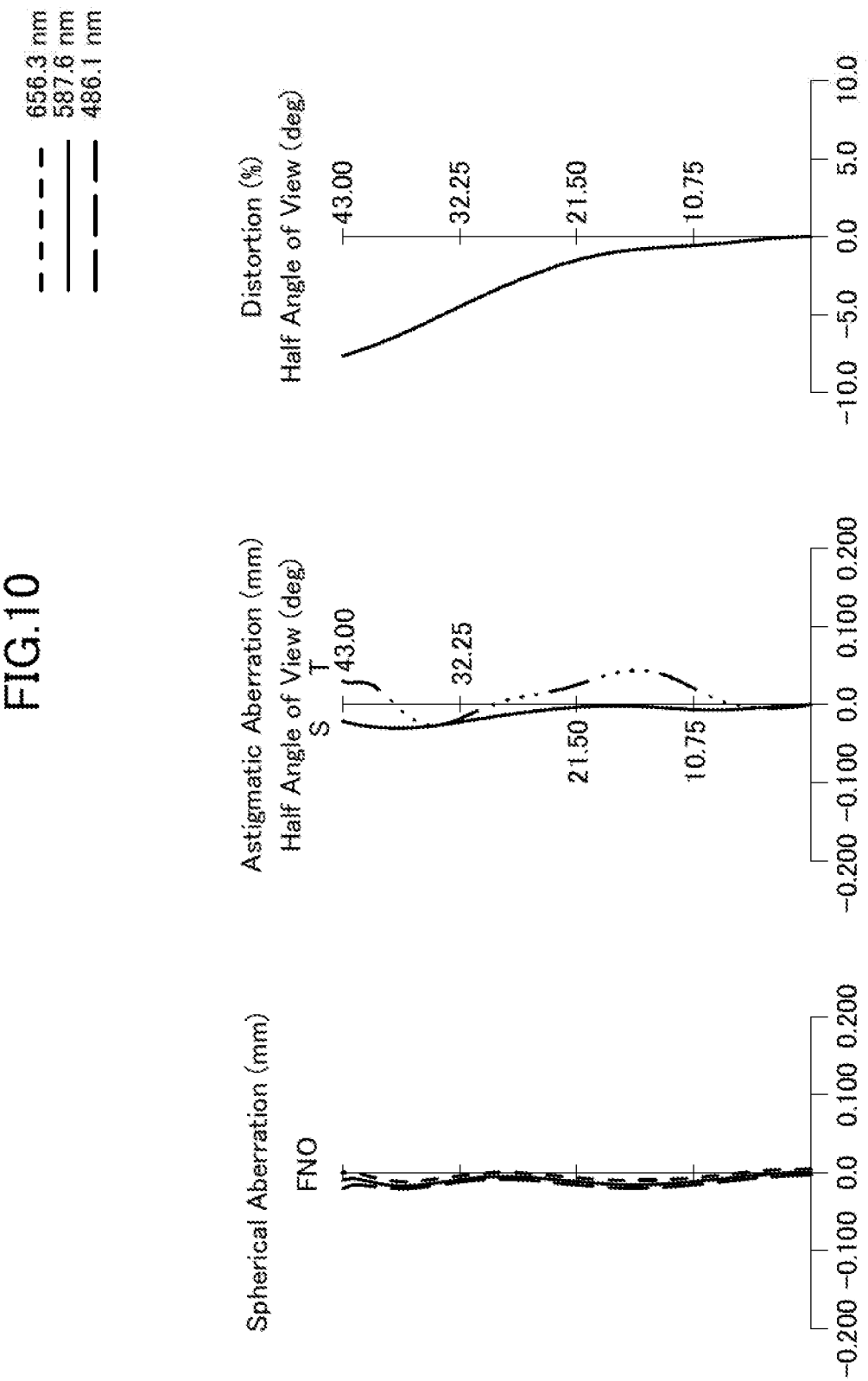
FIG. 10 is an aberration diagram for the fifth embodiment of the imaging optics according to the present invention.

The imaging optics in an embodiment of the invention is preferably comprised, in sequence starting from the object side, of a 1st lens G1 with a negative refractive power, a 2nd lens G2 with a positive refractive power, a 3rd lens G3 with a positive refractive power, a 4th lens G4 with a negative refractive power, a 5th lens G5, a 6th lens G6, and a 7th lens G7 with a negative refractive power. A cover glass C is disposed between the 7th lens G7 and an imaging surface IMG.

The 1st lens G1 with a negative refractive power enables the diameter and size of the 1st lens G1 to be reduced.

In addition, by placing the 2nd lens G2 and the 3rd lens G3 so as to split their positive refractive power, aberration compensation can be assigned respectively to each, thereby improving performance.

By placing the 4th lens G4 with negative refractive power on the image side of the positive refractive power 3rd lens G3, spherical aberration caused by the 2nd lens G2 and the 3rd lens G3 with positive refractive power can be corrected, thereby enabling improved performance.

Also, in the 5th lens G5 through the 7th lens G7, the chief ray passes through at a high position relative to the optical axis, thereby more efficiently correcting image field curvature, distortion, and the like, and constraining increases in the chief ray angle (CRA).

The imaging optics according to an aspect of the invention preferably satisfies the following conditional expression $$0.50 \leq f2/f \leq 1.15 \tag{1-1}$$

Where:
f: focal length of the imaging optics
f2: focal length of the 2nd lens G2.

The conditional expression (1-1) defines the ratio between the focal length of the imaging optics and the focal length of the 2nd lens G2. By satisfying the conditional expression (1-1), the focal length of the 2nd lens G2 can be optimized, and the overall optical length of the imaging optics can be shortened while maintaining high performance.

If the ratio falls below the lower limit of the conditional expression (1-1), the refractive power of the 2nd lens G2 is too strong, making it difficult to correct for spherical aberration and the like, and difficult to design the imaging optics with superior optical performance.

If the ratio exceeds the upper limit of the conditional expression (1-1), the refractive power of 2nd lens G2 is reduced, making it difficult to shorten the overall optical length of the imaging optics.

The lower limit of the conditional expression (1-1) is more preferably 0.58, and even more preferably 0.65. The upper limit of the conditional expression (1-1) is more preferably 1.06, and even more preferably 0.97.

The imaging optics according to an aspect of the invention preferably satisfies the following conditional expression $$0.38 \leq f3/f \leq 1.10 \tag{1-2}$$

Where:
f: focal length of the imaging optics
f3: focal length of the 3rd lens G3.

The conditional expression (1-2) defines the ratio between the focal length of the imaging optics and the focal length of the 3rd lens G3. By satisfying the conditional expression (1-2), the focal length of the 3rd lens G3 can be optimized, and the overall optical length of the imaging optics can be shortened while maintaining high performance.

If the ratio falls below the lower limit of the conditional expression (1-2), the refractive power of the 3rd lens G3 is too strong, making it difficult to correct for spherical aberration and the like, and difficult to design high performance imaging optics.

If the ratio exceeds the upper limit of the conditional expression (1-2), the refractive power of the 3rd lens G3 is reduced, making it difficult to shorten the overall optical length.

The lower limit of the conditional expression (1-2) is more preferably 0.43, and even more preferably 0.49. The upper limit of the conditional expression (1-2) is more preferably 1.01, and even more preferably 0.93.

The imaging optics according to an aspect of the invention preferably satisfies the following conditional expression $$0.015 \leq thi\_max/oal \leq 0.210 \tag{1-3}$$

Where:
thi_max: maximum lens spacing excluding back focal length
oal: optical length from the object side surface of the 1st lens G1 to imaging surface.

The conditional expression (1-3) defines the ratio between the optical length and the maximum lens spacing excluding back focal length. Maximum lens spacing excluding back focal length means the maximum value of the spacings between lenses, from the 1st lens G1 through the 7th lens G7.

By satisfying the conditional expression (1-3), the maximum value of the lens spacing can be optimized, and the overall optical length can be easily shortened.

If the ratio falls below the lower limit of the conditional expression (1-3), spacing for each lens is reduced, making it difficult to place lens mechanisms, focusing mechanisms, and the like.

If the ratio exceeds the upper limit of the conditional expression (1-3), lens spacing increases, making it difficult to design optics with a short overall optical length.

When consideration is given to factors such as the size of the space used to place lens mechanisms, focusing mechanisms, and the like, the lower limit for the conditional expression (1-3) is more preferably 0.017, and even more preferably 0.019, and the upper limit for the conditional expression (1-3) is more preferably 0.192, and even more preferably 0.176.

According to an aspect of the invention, the imaging optics of the invention preferably satisfy conditional expression (2)

$$0.50 \leq |f1|/f \leq 1.71 \tag{2}$$

Where:
f1: focal length of the 1st lens G1.

The conditional expression (2) defines the ratio between the imaging optics overall optical length and the focal length of the 1st lens G1.

By satisfying the conditional expression (2), the diameter of the front lens, i.e., of the 1st lens G1, can be reduced while maintaining high optical performance.

If the ratio falls below the lower limit of the conditional expression (2), the refractive power of the 1st lens G1 increases, making it difficult to correct for aberrations such as image field curvature etc.

If the ratio exceeds the upper limit of the conditional expression (2), the refractive power of the 1st lens G1 decreases, making the 1st lens G1 diameter large.

The lower limit of the conditional expression (2) is more preferably 0.58, and even more preferably 0.65. The upper limit of the conditional expression (2) is more preferably 1.58, and even more preferably 1.45.

An aspect of the invention preferably satisfies the following conditional expression (3)

$$0.38 \leq |f4|/f \leq 1.32 \tag{3}$$

Where:
f4: focal length of the 4th lens G4.

The conditional expression (3) defines the ratio between the focal length f the imaging optics and the absolute value of the focal length of the 4th lens G4.

By satisfying the conditional expression (3), the overall optical length can be shortened while maintaining high optical performance.

If the ratio falls below the lower limit of the conditional expression (3), the negative refractive power is too strong relative to positive refractive power of the 2nd lens G2 and the 3rd lens G3, making it difficult to correct for spherical aberration and to design high performance imaging optics. If the ratio exceeds the upper limit of the conditional expression (3), the negative refractive power is reduced relative to positive refractive power of the 2nd lens G2 and the 3rd lens G3, making it difficult to favorably correct for spherical aberration and the like occurring in the 2nd lens G2 and the 3rd lens G3.

The lower limit of the conditional expression (3) is more preferably 0.44, and even more preferably 0.49. The upper limit of the conditional expression (3) is more preferably 1.22, and even more preferably 1.12.

According to an aspect of the invention, the imaging optics of the present embodiment preferably satisfies the following conditional expression (4)

$$0.01 \leq thiG1G2/oal \leq 0.03 \quad (4)$$

Where:
thiG1G2: spacing of the 1st lens G1 and the 2nd lens G2.

The conditional expression (4) defines the ratio between the overall optical length of the imaging optics and the spacing between the 1st lens G1 and 2nd lens G2.

By satisfying the conditional expression (4), shortening of the overall optical length can be easily accomplished.

If the ratio falls below the lower limit of the conditional expression (4), the spacing between the 1st lens G1 and the 2nd lens G2 becomes too short, making it difficult to place the lens mechanism, focusing mechanism, and the like.

If the ratio exceeds the upper limit of the conditional expression (4), the lens spacing becomes too long, making it difficult to design optics with a short overall optical length.

The lower limit of the conditional expression (4) is more preferably 0.012, and even more preferably 0.013. The upper limit of the conditional expression (4) is more preferably 0.026, and even more preferably 0.024.

According to an aspect of the invention, the imaging optics of the present embodiment preferably satisfies the following conditional expression (5)

$$0.88 \leq allthi/f \leq 2.15 \quad (5)$$

Where:
allthi: distance from an object side surface of the 1st lens G1 to the image side surface of the 7th lens G7.

The conditional expression (5) defines the ratio of the focal length of the imaging optics and the distance on the optical axis from the object side surface of the 1st lens G1 to the image side surface of the 7th lens G7.

By satisfying the conditional expression (5), shortening of the overall optical length can be easily accomplished.

If the ratio falls below the lower limit of the conditional expression (5), spacing for each lens becomes too short, making it difficult to place lens mechanisms, focusing mechanism, and the like. If the ratio exceeds the upper limit of the conditional expression (5), the lens spacing becomes too long, making it difficult to design the imaging optics with a short overall optical length.

The lower limit of the conditional expression (5) is more preferably 1.0, and even more preferably 1.13. The upper limit of the conditional expression (5) is more preferably 1.99, and even more preferably 1.82.

According to an aspect of the invention, the imaging optics of the present embodiment preferably satisfies the following conditional expression (6)

$$1.95 \leq f567/f \leq 13.95 \quad (6)$$

Where:
f567: combined focal length of the 5th lens G5, the 6th lens G6, and the 7th lens G7.

Conditional expression (6) defines the ratio between the focal length of the imaging optics and the combined focal length of the 5th lens G5, the 6th lens G6, and the 7th lens G7. By satisfying the conditional expression (6), a shorter overall optical length can be easily achieved while maintaining high optical performance.

If the ratio falls below the lower limit of conditional expression (6), the positive combined refractive power of the 5th lens G5, the 6th lens G6, and the 7th lens G7 becomes too strong, making it difficult to correct image field curvature, astigmatism, and the like, and to design high performance imaging optics. If the ratio exceeds the upper limit of the conditional expression (6), the positive combined refractive power of the 5th lens G5, the 6th lens G6, and the 7th lens G7 is decreased, making it difficult to shorten t overall optical length.

The lower limit of the conditional expression (6) is more preferably 2.33, and even more preferably 2.51. The upper limit of the conditional expression (6) is more preferably 12.87, and even more preferably 11.80.

According to an aspect of the invention, the imaging optics of the present embodiment preferably satisfies the following conditional expression (7)

$$0.20 \leq R7/f \leq 0.43 \quad (7)$$

Where:
R7: paraxial radius of curvature of the image side surface of the 7th lens G7.

The conditional expression (7) defines the ratio between the focal length of the imaging optics and the paraxial radius of curvature of the image side surface of the 7th lens G7. By satisfying the conditional expression (7), a shorter overall optical length can be easily achieved while maintaining high optical performance.

If the ratio falls below the lower limit of the conditional expression (7), the curvature of the image side surface of the 7th lens G7 increases and its negative power becomes too strong, making it difficult to correct for image field curvature, astigmatism, and the like, and to design high performance imaging optics. If the ratio exceeds the upper limit of the conditional expression (7), the curvature of the image side surface of the 7th lens G7 decreases and power becomes too weak, making it difficult to correct for image field curvature, astigmatism, and the like.

The lower limit of the conditional expression (7) is more preferably 0.23, and even more preferably 0.26. The upper limit of the conditional expression (7) is more preferably 0.40, and even more preferably 0.37.

According to an aspect of the invention, in the imaging optics of the present invention the 1st lens G1 is preferably a biconcave lens.

Adoption of a biconcave lens for 1st lens G1 enables the refractive power of the 1st lens G1 to be easily strengthened while minimizing aberration caused by the 1st lens G1, so that the diameter of the 1st lens G1 can be reduced.

According to an aspect of the invention, in the imaging optics of the present invention the 2nd lens G2 is preferably a biconcave lens.

Adoption of the biconcave lens for the 2nd lens G2 enables the refractive power of the 2nd lens G2 to be strengthened so that shortening of the overall optical length can be efficiently accomplished.

According to an aspect of the imaging optics of the invention the object side surface of the 5th lens G5 is preferably a concave surface facing the object side.

Using the concave surface facing the object side of the 5th lens G5 enables favorable correction of astigmatism.

According to an aspect of the invention, in the imaging optics of the invention the object side surface of the 6th lens G6 is preferably a concave surface facing the object side.

Using the concave surface facing the object side of the 6th lens G6 enables favorable correction of sagittal astigmatism.

According to an aspect of the invention, in the imaging optics of the invention the 7th lens G7 preferably has a negative refractive power.

Since that the 7th lens G7 has a negative refractive power, the 5th lens G5, the 6th lens G6, and the 7th lens G7 are made to have a positive refractive power, such that the 5th lens G5, the 6th lens G6, and the 7th lens G7 can be formed as telephoto optics, resulting in an advantage for shortening the overall optical length.

In an aspect of the invention, it is preferable in the imaging optics of the embodiment for the image side surface of the 7th lens G7 to be a concave surface facing the image side, and to have an inflection point not on the optical axis.

In imaging optics according to the invention, by using a concave surface facing the image side of the 7th lens G7, and providing an inflection point not on the optical axis, the periphery portion of the 7th lens G7 has a positive refractive power so that increases in the chief ray angle (CRA) can be constrained.

According to an aspect of the invention, in the imaging optics of the invention an aperture stop is disposed between the 2nd lens G2 and the 3rd lens.

By placement of the aperture stop between the 2nd lens G2 with a positive refractive power and the 3rd lens G3 with a positive refractive power, and in addition by constituting a symmetrical lens out of the 2nd lens G2 with a positive refractive power, the aperture stop, and the 3rd lens G3 with positive refractive power, various aberrations can be easily compensated.

According to an aspect of the invention, it is preferable in the imaging optics of the invention that an aperture stop is placed between the 2nd lens G2 and the 3rd lens G3, the image side surface of the 2nd lens G2 is a convex surface facing the image side, and the object side surface of the 3rd lens G3 is a convex facing the object side.

According to, in addition to placing the aperture stop between the 2nd lens G2 and the 3rd lens G3, adopting a convex surface facing the image side for the image side surface of the 2nd lens G2, and a concave surface facing the object side for the object side surface of the 3rd lens G3, it is possible to enlarge the peripheral part of the interval between the 2nd lens G2 and the 3rd lens G3 so that the aperture stop mechanism can be easily placed.

According to an aspect of the invention, in the imaging optics of the invention, the 1st lens G1 and the 2nd lens G2 are preferably separated by an air gap.

Placing the 1st lens G1 and the 2nd lens G2 so as to be separated by the air gap, in other words, that the 1st lens G1 and the 2nd lens G2 are preferably not joined. By interposing the air gap, correction of aberrations is increased, and higher performance can be achieved.

An aspect of the invention is preferably an imaging device comprising an imaging lens and an imaging element disposed on the image side of the imaging lens. Here there is no particular limitation as to the imaging element or the like, a CCD or CMOS sensor or other solid state imaging element may also be used.

An imaging device using these solid state imaging elements, such as a digital camera or video camera, is shown as an example of an imaging device according to an aspect of the invention. Also, the imaging device may of course be a fixed-lens type of imaging device in which lenses are affixed to the body, or an imaging device with interchangeable lenses, such as single lens reflex camera or a mirrorless single lens camera.

According to the invention, an imaging device with superior optical performance is constituted, comprising a compact imaging optics.

Embodiment

Next, based on numerical tables and diagrams, we explain embodiments of the invention.

For each embodiment, the specification tables share in common that F indicates focal length (mm) of the imaging optics, Fno indicates the F number, and W indicates the half angle of view. In the lens numerical table, No. indicates surface number, R indicates curvature radius, D indicates spacing or thickness, Nd indicates d line refractive index, and Vd indicates the d line-based Abbe number. A surface with an ASPH is an aspherical surface and a surface with a STOP is an aperture stop.

The aspherical coefficient in each embodiment is the value when the aspherical surface shape is defined in Expression (A) below.

$$Z = \frac{h^2/r}{1+\sqrt{1-(1+\kappa)(h/r)^2}} + \sum A_n h^n \quad \text{Expression (A)}$$

In the above expression, "Z" shall represent the amount of displacement from a reference surface in the optical axis direction, "r" the curvature radius at surface peak, "h" the height from the optical axis in a direction normal to the optical axis, "k" the conic coefficient, and "An" the nth order asphericity coefficient.

Shown in the aberration diagrams (FIG. 2, FIG. 4, FIG. 6, FIG. 8, FIG. 10) for each embodiment, sequentially starting from the left side as seen in the diagram, are a spherical aberration diagram (mm), astigmatism diagram (mm), and distortion diagram (%).

In the spherical aberration diagram, the vertical axis is the F number and the horizontal axis is defocus; the solid line shows the d line (wavelength A=587.6 nm), the short dash line the C line (wavelength A=656.3 nm), and the long dash line the F line (wavelength A=486.1 nm).

In the astigmatism diagram, the vertical axis is the image height (mm) or half angle of view, and the horizontal axis is defocus; the solid line shows the sagittal surface (S) relative to the d line, and the dashed line shows the meridional cross section (T) relative to the d line.

In the distortion diagram, the vertical axis represents image height (mm) or half angle of view (deg), and the horizontal axis represents %.

Embodiment 1

The first embodiment of the imaging optics is constituted, in sequence starting from the object side, of a 1st lens G1 with negative refractive power, a 2nd lens G2 with positive refractive power, an aperture stop, a 3rd lens G3 with positive refractive power, a 4th lens G4 with negative refractive power, a 5th lens G5 with positive refractive power, a 6th lens G6 with positive refractive power, and a 7th lens G7 with negative refractive power.

(Specification Table)

| | | |
|---|---|---|
| F | | 9.0610 |
| Fno | | 1.8712 |
| W | | 39.6731 |

(Lens Numerical Table)

| No. | R | D | Nd | Vd |
|---|---|---|---|---|
| 1ASPH | −60.0000 | 0.5000 | 1.68893 | 31.16 |
| 2ASPH | 9.5334 | 0.2884 | | |
| 3ASPH | 9.1155 | 2.0205 | 1.85135 | 40.10 |
| 4ASPH | −24.4204 | 0.5020 | | |
| 5STOP | 0.0000 | 0.7580 | | |
| 6ASPH | 6.5271 | 1.2983 | 1.72903 | 54.04 |
| 7ASPH | −35.3103 | 0.1000 | | |
| 8ASPH | 11.4342 | 0.5500 | 1.82115 | 24.06 |
| 9ASPH | 4.4563 | 1.3006 | | |
| 10ASPH | −50.0000 | 0.9260 | 1.53113 | 55.75 |
| 11ASPH | −25.9202 | 0.6975 | | |
| 12ASPH | −3.0845 | 0.9833 | 1.53113 | 55.75 |
| 13ASPH | −3.0000 | 0.1000 | | |
| 14ASPH | 3.4192 | 1.3278 | 1.53113 | 55.75 |
| 15ASPH | 2.8048 | 1.6763 | | |
| 16 | 0.0000 | 0.8000 | 1.51680 | 64.20 |
| 17 | 0.0000 | 1.0000 | | |
| 18 | 0.0000 | 0.0000 | | |

(Aspherical Coefficient)

| No. | K | A4 | A6 | A8 | A10 |
|---|---|---|---|---|---|
| 1 | −10.00000E+00 | −7.99317E−04 | −1.64525E−04 | 2.21408E−05 | −9.89043E−07 |
| 2 | −6.45734E+00 | 2.30405E−03 | −3.59904E−04 | −1.17491E−05 | 4.75302E−06 |
| 3 | 1.24671E+00 | 6.85099E−04 | −1.16966E−04 | −3.48107E−05 | 4.91985E−06 |
| 4 | 2.46637E−01 | −6.93388E−04 | 1.60708E−05 | −5.27921E−06 | 4.52765E−07 |
| 6 | 2.66850E+00 | −2.01746E−03 | 4.42165E−04 | −2.02037E−04 | 3.95010E−05 |
| 7 | 10.00000E+00 | 2.75107E−03 | 2.85235E−04 | −5.50655E−04 | 1.54971E−04 |
| 8 | 2.64773E+00 | −1.58446E−03 | 1.05724E−03 | −7.33691E−04 | 1.87585E−04 |
| 9 | −8.33382E+00 | 6.65723E−03 | −4.72599E−04 | −1.15091E−04 | 4.97207E−05 |
| 10 | 7.44502E+00 | −4.63682E−03 | 2.43882E−04 | −6.73690E−05 | 1.02683E−05 |
| 11 | 9.78455E+00 | 1.02906E−03 | −8.42629E−04 | 1.03912E−04 | −1.17803E−05 |
| 12 | −6.71069E+00 | 1.20711E−02 | −3.91600E−03 | 6.88294E−04 | −7.34313E−05 |
| 13 | −5.31227E+00 | −2.81463E−03 | −4.89863E−04 | 1.39514E−04 | −1.07071E−05 |
| 14 | −7.99814E−01 | −2.13101E−02 | 1.48907E−03 | −7.64171E−05 | 2.53235E−06 |
| 15 | −4.16315E+00 | −6.87367E−03 | 4.38250E−04 | −2.15969E−05 | 6.70098E−07 |

| No. | A12 | A14 |
|---|---|---|
| 1 | 1.44187E−08 | 0.00000E+00 |
| 2 | −2.00543E−07 | 0.00000E+00 |
| 3 | −1.76397E−07 | 0.00000E+00 |
| 4 | −1.23010E−08 | 0.00000E+00 |
| 6 | −3.96615E−06 | 1.54075E−07 |
| 7 | −1.81159E−05 | 7.87855E−07 |
| 8 | −2.11882E−05 | 9.02252E−07 |
| 9 | −6.43085E−06 | 2.96217E−07 |
| 10 | −5.49548E−07 | 0.00000E+00 |
| 11 | 5.22413E−07 | 0.00000E+00 |
| 12 | 4.04322E−06 | −8.93947E−08 |
| 13 | 3.70487E−07 | −5.34213E−09 |
| 14 | −4.61996E−08 | 3.47059E−10 |
| 15 | −1.23416E−08 | 1.00555E−10 |

Embodiment 2

The second embodiment of the imaging optics is constituted, in sequence starting from the object side, of a 1st lens G1 with negative refractive power, a 2nd lens G2 with positive refractive power, an aperture stop, a 3rd lens G3 with positive refractive power, a 4th lens G4 with negative refractive power, a 5th lens G5 with negative refractive power, a 6th lens G6 with positive refractive power, and a 7th lens G7 with negative refractive power.

(Specification Table)

| | | |
|---|---|---|
| F | | 9.0610 |
| Fno | | 1.8704 |
| W | | 39.6506 |

(Lens Numerical Table)

| No. | R | D | Nd | Vd |
|---|---|---|---|---|
| 1ASPH | −40.1819 | 0.5000 | 1.68893 | 31.16 |
| 2ASPH | 7.2193 | 0.2367 | | |
| 3ASPH | 6.8498 | 2.1742 | 1.85135 | 40.10 |
| 4ASPH | −25.0773 | 0.5810 | | |
| 5STOP | 0.0000 | 0.6256 | | |
| 6ASPH | 6.8263 | 1.2634 | 1.72903 | 54.04 |
| 7ASPH | −18.3990 | 0.1000 | | |
| 8ASPH | 12.1327 | 0.5500 | 1.82115 | 24.06 |
| 9ASPH | 4.2494 | 1.5249 | | |
| 10ASPH | −36.2718 | 0.6607 | 1.53113 | 55.75 |
| 11ASPH | −60.8868 | 0.5631 | | |
| 12ASPH | −3.6412 | 1.0438 | 1.53113 | 55.75 |
| 13ASPH | −3.1500 | 0.1000 | | |
| 14ASPH | 3.8187 | 1.4240 | 1.53113 | 55.75 |
| 15ASPH | 2.9855 | 1.6139 | | |
| 16 | 0.0000 | 0.8000 | 1.51680 | 64.20 |
| 17 | 0.0000 | 1.0000 | | |
| 18 | 0.0000 | 0.0000 | | |

(Aspherical Coefficient)

| No. | K | A4 | A6 | A8 | A10 |
|---|---|---|---|---|---|
| 1 | 2.68675E+00 | −7.76507E−04 | −1.46573E−04 | 2.15527E−05 | −105632E−06 |
| 2 | −2.20548E+00 | 2.35372E−03 | −4.09810E−04 | −1.12883E−05 | 5.14120E−06 |
| 3 | 1.11990E+00 | 6.28509E−04 | −1.67345E−04 | −3.39721E−05 | 4.77441E−06 |
| 4 | −3.16516E+00 | −4.94297E−04 | 3.33112E−05 | −7.44673E−06 | 2.75362E−07 |
| 6 | 2.64670E+00 | −1.92780E−03 | 5.12004E−04 | −2.01356E−04 | 3.91704E−05 |
| 7 | −10.00000E+00 | 3.64355E−04 | 3.51315E−04 | −5.43364E−04 | 1.53363E−04 |
| 8 | 2.95293E+00 | −1.95060E−03 | 1.29070E−03 | −7.47190E−04 | 1.86071E−04 |
| 9 | −8.09818E+00 | 6.45059E−03 | −4.49379E−04 | −1.15076E−04 | 4.97437E−05 |
| 10 | −2.72292E+00 | −6.30905E−03 | 5.50127E−04 | −8.59729E−05 | 9.25927E−06 |
| 11 | 1.00000E+01 | 2.34499E−04 | −8.34958E−04 | 1.08086E−04 | −1.15399E−05 |
| 12 | −9.53048E+00 | 1.27899E−02 | −4.12667E−03 | 7.00186E−04 | −7.29830E−05 |
| 13 | −6.17079E+00 | −3.50658E−03 | −4.59206E−04 | 1.38656E−04 | −1.06953E−05 |
| 14 | −7.93820E−01 | −2.03360E−02 | 1.58474E−03 | −8.48609E−05 | 2.77212E−06 |
| 15 | −5.17389E+00 | −6.24216E−03 | 4.18415E−04 | −2.12968E−05 | 6.70547E−07 |

| No. | A12 | A14 |
|---|---|---|
| 1 | 1.69975E−08 | 0.00000E+00 |
| 2 | −2.23878E−07 | 0.00000E+00 |
| 3 | −1.70850E−07 | 0.00000E+00 |
| 4 | 5.99775E−09 | 0.00000E+00 |
| 6 | −3.90806E−06 | 1.53741E−07 |
| 7 | −1.83854E−05 | 8.18499E−07 |
| 8 | −2.13316E−05 | 9.18566E−07 |
| 9 | −6.59439E−06 | 3.03777E−07 |
| 10 | −4.24248E−07 | 0.00000E+00 |
| 11 | 4.93624E−07 | 0.00000E+00 |
| 12 | 4.01014E−06 | −8.80937E−08 |
| 13 | 3.76197E−07 | −5.56950E−09 |
| 14 | −4.84986E−08 | 3.47059E−10 |
| 15 | −1.24187E−08 | 1.01244E−10 |

Embodiment 3

The third embodiment of the imaging optics is constituted, in sequence starting from the object side, of a 1st lens G1 with negative refractive power, a 2nd lens G2 with positive refractive power, an aperture stop, a 3rd lens G3 with positive refractive power, a 4th lens G4 with negative refractive power, a 5th lens G5 with positive refractive power, a 6th lens G6 with positive refractive power, and a 7th lens G7 with negative refractive power.

(Specification Table)

| | F | 9.0610 |
|---|---|---|
| | Fno | 1.8779 |
| | W | 39.1173 |

(Lens Numerical Table)

| No. | R | D | Nd | Vd |
|---|---|---|---|---|
| 1ASPH | −59.4690 | 0.5000 | 1.68893 | 31.16 |
| 2ASPH | 7.4597 | 0.2234 | | |
| 3ASPH | 7.0278 | 1.9687 | 1.85135 | 40.10 |
| 4ASPH | −49.0829 | 0.6418 | | |
| 5STOP | 0.0000 | 0.7512 | | |
| 6ASPH | 5.9492 | 1.6876 | 1.72903 | 54.04 |
| 7ASPH | −7.8432 | 0.1000 | | |
| 8ASPH | −238.5598 | 0.5500 | 1.90366 | 31.31 |
| 9ASPH | 4.5531 | 1.1311 | | |
| 10ASPH | −48.6547 | 0.8006 | 1.53113 | 55.75 |
| 11ASPH | −14.2426 | 0.5786 | | |
| 12ASPH | −3.0002 | 0.8951 | 1.53113 | 55.75 |
| 13ASPH | −3.0000 | 0.1000 | | |
| 14ASPH | 3.5917 | 1.4141 | 1.53113 | 55.75 |
| 15ASPH | 2.9272 | 1.9911 | | |
| 16 | 0.0000 | 0.8000 | 1.51680 | 64.20 |
| 17 | 0.0000 | 1.0000 | | |
| 18 | 0.0000 | 0.0000 | | |

(Aspherical Coefficient)

| No. | K | A4 | A6 | A8 | A10 |
|---|---|---|---|---|---|
| 1 | −7.55222E+00 | −9.95733E−04 | −1.36161E−04 | 2.26931E−05 | −1.05733E−06 |
| 2 | −2.34711E+00 | 2.24577E−03 | −3.95337E−04 | −7.73337E−06 | 5.03807E−06 |
| 3 | 9.81655E−01 | 7.15970E−04 | −1.73406E−04 | −3.36506E−05 | 5.23485E−06 |
| 4 | 7.94258E+00 | −1.38987E−03 | 8.35520E−05 | −6.18286E−06 | −1.61903E−07 |
| 6 | 2.44162E+00 | −4.11251E−03 | 3.51737E−04 | −1.92185E−04 | 3.97746E−05 |
| 7 | −3.40169E+00 | 3.39462E−03 | 2.51556E−04 | −5.24920E−04 | 1.53984E−04 |
| 8 | 8.75000E+00 | −2.81663E−03 | 1.62747E−03 | −7.50284E−04 | 1.86999E−04 |
| 9 | −10.00000E+00 | 5.21312E−03 | −2.47202E−04 | −1.40128E−04 | 4.94685E−05 |
| 10 | −5.09606E+00 | −9.29964E−04 | 4.22347E−04 | −1.20751E−04 | 1.31242E−05 |
| 11 | −9.33118E+00 | 4.83079E−03 | −8.48776E−04 | 1.00381E−04 | −1.28027E−05 |
| 12 | −6.61377E+00 | 1.53724E−02 | −4.16877E−03 | 7.17196E−04 | −7.41197E−05 |
| 13 | −6.10315E+00 | −1.85333E−03 | −4.95684E−04 | 1.35619E−04 | −1.04970E−05 |
| 14 | −7.78480E−01 | −1.96398E−02 | 1.36925E−03 | −7.18452E−05 | 2.44975E−06 |
| 15 | −4.30916E+00 | −6.01441E−03 | 3.67203E−04 | −1.86480E−05 | 5.96277E−07 |

| No. | A12 | A14 |
|---|---|---|
| 1 | 1.57326E−08 | 0.00000E+00 |
| 2 | −1.73536E−07 | 0.00000E+00 |
| 3 | −1.72457E−07 | 0.00000E+00 |
| 4 | 2.80262E−08 | 0.00000E+00 |
| 6 | −4.04801E−06 | 1.40261E−07 |
| 7 | −1.81859E−05 | 7.62593E−07 |
| 8 | −2.16815E−05 | 9.21901E−07 |
| 9 | −6.24843E−06 | 2.73515E−07 |
| 10 | −4.87380E−07 | 0.00000E+00 |
| 11 | 6.04684E−07 | 0.00000E+00 |
| 12 | 3.84436E−06 | −7.55993E−08 |
| 13 | 3.76798E−07 | −5.72301E−09 |
| 14 | −4.56426E−08 | 3.47059E−10 |
| 15 | −1.13788E−08 | 9.65195E−11 |

Embodiment 4

The fourth embodiment of the imaging optics is constituted, in sequence starting from the object side, of a 1st lens G1 with negative refractive power, a 2nd lens G2 with positive refractive power, an aperture stop, a 3rd lens G3 with positive refractive power, a 4th lens G4 with negative refractive power, a 5th lens G5 with negative refractive power, a 6th lens G6 with positive refractive power, and a 7th lens G7 with negative refractive power.

(Specification Table)

| | |
|---|---|
| F | 9.5610 |
| Fno | 2.3806 |
| W | 37.4922 |

(Lens Numerical Table)

| No. | R | D | Nd | Vd |
|---|---|---|---|---|
| 1ASPH | −60.0000 | 0.5000 | 1.68893 | 31.16 |
| 2ASPH | 7.2023 | 0.2317 | | |
| 3ASPH | 8.3326 | 1.9078 | 1.85135 | 40.10 |
| 4ASPH | −20.3540 | 1.3873 | | |
| 5STOP | 0.0000 | 1.1660 | | |
| 6ASPH | 6.4426 | 1.3382 | 1.72903 | 54.04 |
| 7ASPH | −29.2730 | 0.1000 | | |
| 8ASPH | 10.2118 | 0.5500 | 1.82115 | 24.06 |
| 9ASPH | 4.3356 | 1.6291 | | |
| 10ASPH | −57.1382 | 0.6306 | 1.53113 | 55.75 |
| 11ASPH | −207.9615 | 0.5667 | | |
| 12ASPH | −3.6960 | 1.0582 | 1.53113 | 55.75 |
| 13ASPH | −3.0531 | 0.1000 | | |
| 14ASPH | 3.8273 | 1.3541 | 1.53113 | 55.75 |
| 15ASPH | 2.7878 | 1.9445 | | |
| 16 | 0.0000 | 0.8000 | 1.51680 | 64.20 |
| 17 | 0.0000 | 1.0000 | | |
| 18 | 0.0000 | 0.0000 | | |

(Aspherical Coefficient)

| No. | K | A4 | A6 | A8 | A10 |
|---|---|---|---|---|---|
| 1 | 9.73690E+00 | −9.45222E−04 | −1.55718E−04 | 2.16836E−05 | −104078E−06 |
| 2 | −3.29834E+00 | 2.18628E−03 | −4.13831E−04 | −1.23730E−05 | 5.10339E−06 |
| 3 | 1.14499E+00 | 5.07626E−04 | −1.64869E−04 | −3.32972E−05 | 4.82535E−06 |
| 4 | 8.02504E+00 | −6.33167E−04 | 2.14547E−05 | −6.39055E−06 | 3.91920E−07 |
| 6 | 2.88755E+00 | −1.77368E−03 | 4.32365E−04 | −1.97534E−04 | 3.94006E−05 |
| 7 | −4.54961E+00 | 4.08626E−03 | 3.52363E−04 | −5.44045E−04 | 1.52778E−04 |
| 8 | 3.93818E+00 | −1.75318E−03 | 1.27623E−03 | −7.52071E−04 | 1.86048E−04 |
| 9 | −8.06453E+00 | 6.40343E−03 | −4.53365E−04 | −1.14187E−04 | 4.98632E−05 |
| 10 | −4.34282E+00 | −5.43007E−03 | 4.68809E−04 | −8.73972E−05 | 9.41359E−06 |
| 11 | 1.00000E+01 | 1.25577E−03 | −8.63304E−04 | 1.05841E−04 | −1.16307E−05 |
| 12 | −9.60937E+00 | 1.42523E−02 | −4.12863E−03 | 6.98513E−04 | −7.33823E−05 |
| 13 | −6.58858E+00 | −2.77642E−03 | −4.71779E−04 | 1.37331E−04 | −1.07481E−05 |
| 14 | −8.04578E−01 | −2.01308E−02 | 1.46731E−03 | −7.66514E−05 | 2.55485E−06 |
| 15 | −5.43241E+00 | −5.52665E−03 | 3.18309E−04 | −1.44919E−05 | 4.07176E−07 |

| No. | A12 | A14 |
|---|---|---|
| 1 | 1.65008E−08 | 0.00000E+00 |
| 2 | −2.11929E−07 | 0.00000E+00 |
| 3 | −1.68172E−07 | 0.00000E+00 |
| 4 | −7.06244E−09 | 0.00000E+00 |
| 6 | −4.02991E−06 | 1.39933E−07 |
| 7 | −1.84601E−05 | 8.05772E−07 |
| 8 | −2.13152E−05 | 9.13349E−07 |
| 9 | −6.60763E−06 | 3.07005E−07 |
| 10 | −4.44478E−07 | 0.00000E+00 |
| 11 | 4.76811E−07 | 0.00000E+00 |
| 12 | 3.98771E−06 | −8.56704E−08 |
| 13 | 3.74615E−07 | −5.30932E−09 |
| 14 | −4.65621E−08 | 3.47059E−10 |
| 15 | −6.76425E−09 | 4.87156E−11 |

Embodiment 5

The fifth embodiment of the imaging optics is constituted, in sequence starting from the object side, of a 1st lens G1 with negative refractive power, a 2nd lens G2 with positive refractive power, an aperture stop, a 3rd lens G3 with positive refractive power, a 4th lens G4 with negative refractive power, a 5th lens G5 with negative refractive power, a 6th lens G6 with positive refractive power, and a 7th lens G7 with negative refractive power.

(Specification Table)

|   |         |
|---|---------|
| F   | 4.5279 |
| Fno | 1.8953 |
| W   | 43.0000 |

(Lens Numerical Table)

| No. | R | D | Nd | Vd |
|---|---|---|---|---|
| 1 | 0.0000 | 0.0000 | | |
| 2ASPH | −3.5490 | 0.7273 | 1.53113 | 55.75 |
| 3ASPH | 3.6218 | 0.2000 | | |
| 4ASPH | 2.3342 | 1.6013 | 1.53113 | 55.75 |
| 5ASPH | −4.7294 | 0.0712 | | |
| 6STOP | 0.0000 | 0.1288 | | |
| 7ASPH | 3.5208 | 1.6169 | 1.53113 | 55.75 |
| 8ASPH | −4.4063 | 0.1000 | | |
| 9ASPH | −7.7044 | 0.4317 | 1.65096 | 21.51 |
| 10ASPH | 4.4573 | 0.2000 | | |
| 11 | 22.6884 | 0.3035 | 1.53113 | 55.75 |
| 12 | 25.9476 | 0.2000 | | |
| 13ASPH | −32.3231 | 1.2855 | 1.65096 | 21.51 |
| 14ASPH | −2.5725 | 0.1202 | | |
| 15ASPH | 4.1734 | 0.5175 | 1.65096 | 21.51 |
| 16ASPH | 1.5065 | 0.8531 | | |
| 17 | 0.0000 | 0.4000 | 1.51680 | 64.20 |
| 18 | 0.0000 | 0.5660 | | |
| 19 | 0.0000 | 0.0000 | | |

(Aspherical Coefficient)

| No. | K | A4 | A6 | A8 | A10 |
|---|---|---|---|---|---|
| 2 | −2.66071E−01 | 3.48007E−02 | −8.38690E−03 | 1.50845E−03 | −1.53475E−04 |
| 3 | −1.01817E+00 | −5.34179E−03 | 1.85838E−02 | −9.39753E−03 | 2.44157E−03 |
| 4 | −2.64697E+00 | −2.82684E−02 | 1.74984E−02 | −7.66512E−03 | 1.65418E−03 |
| 5 | −1.19299E+01 | −1.74543E−03 | −6.50626E−03 | 1.95580E−03 | −2.96300E−04 |
| 7 | 1.70443E−01 | 2.71100E−02 | −1.01686E−02 | 3.28378E−03 | 8.45885E−04 |
| 8 | 2.49301E−01 | 4.13725E−02 | −7.35554E−02 | 7.64984E−02 | −4.28154E−02 |
| 9 | 2.04746E+01 | 2.20051E−02 | −8.18930E−02 | 9.48505E−02 | −5.48791E−02 |
| 10 | −7.14756E+00 | 9.38008E−03 | −2.96526E−02 | 3.73411E−02 | −2.11181E−02 |
| 13 | 2.83457E+02 | 1.69911E−02 | −2.66225E−02 | 1.45464E−02 | −6.72806E−03 |
| 14 | −10.00000E+00 | 5.43304E−03 | −2.86994E−02 | 1.78620E−02 | −6.17396E−03 |
| 15 | −3.10456E−01 | −9.94554E−02 | 1.43312E−02 | 4.13219E−04 | −2.65807E−04 |
| 16 | −6.26085E+00 | −4.28858E−02 | 8.69099E−03 | −9.39670E−04 | 4.80754E−05 |

| No. | A12 | A14 |
|---|---|---|
| 2 | 6.41741E−06 | 0.00000E+00 |
| 3 | −2.17583E−04 | 0.00000E+00 |
| 4 | −1.23781E−04 | 0.00000E+00 |
| 5 | 1.71864E−05 | 0.00000E+00 |
| 7 | −6.80036E−04 | 1.22376E−04 |
| 8 | 1.23029E−02 | −1.44590E−03 |
| 9 | 1.55955E−02 | −1.82366E−03 |
| 10 | 6.23318E−03 | −7.59993E−04 |
| 13 | 1.82078E−03 | −2.00646E−04 |
| 14 | 1.14628E−03 | −8.60263E−05 |
| 15 | 2.86489E−05 | −1.66970E−06 |
| 16 | 3.01068E−07 | −1.02613E−07 |

Figure 11:
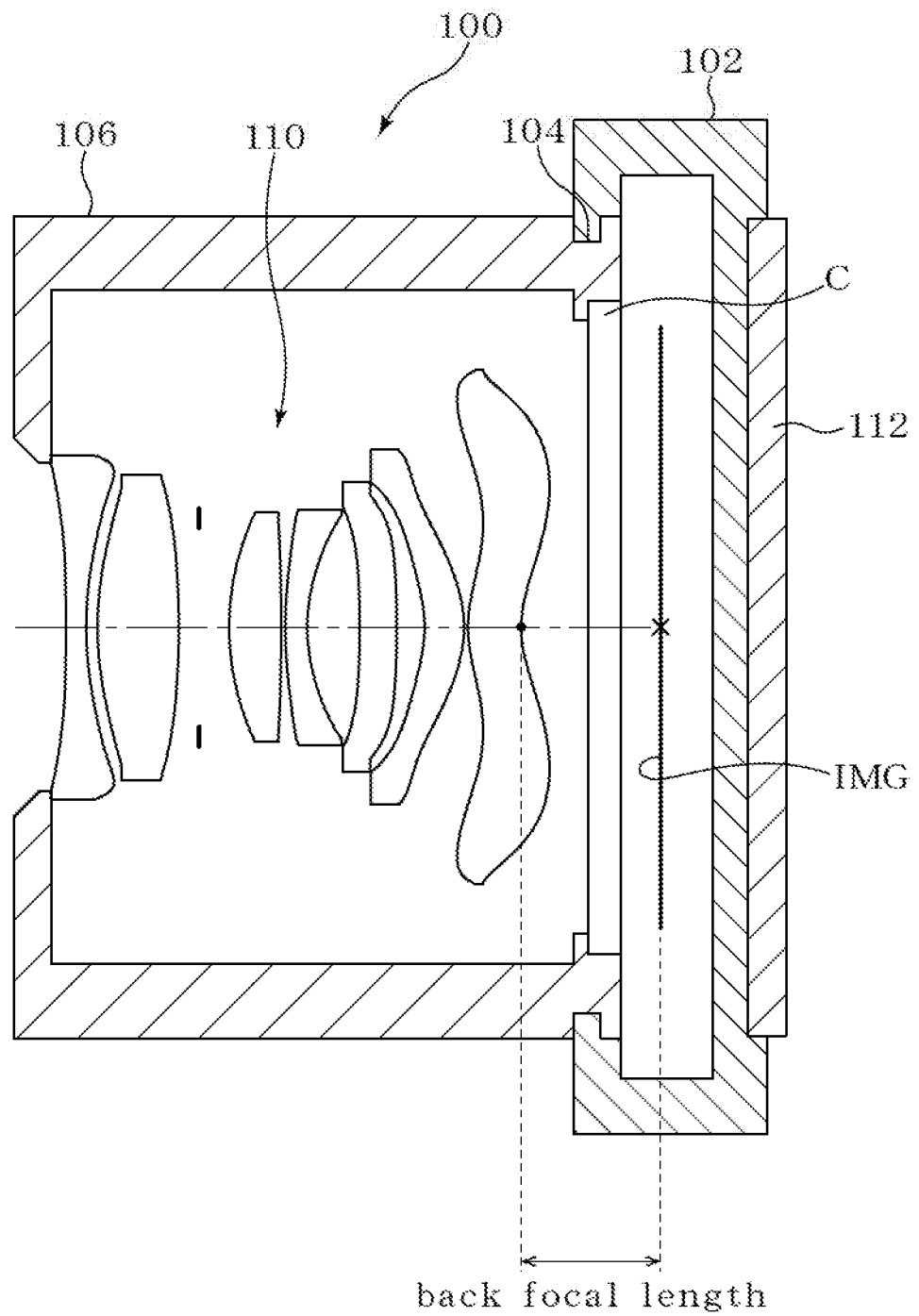
FIG. 11 is a constitutional diagram for an embodiment of the imaging device of the invention.

In an embodiment of an image capture device 100, as shown in FIG. 11, an imaging lens 110 is supported by a lens barrel 106, which is inserted into an imaging device housing 102 by a lens mount 104. A subject image is formed on imaging surface IMG by the imaging lens 110, and the subject image is displayed on a display 112.

| (Numerical Values In The Conditional Expressions) | | | | | | |
|---|---|---|---|---|---|---|
| | | Emb. 1 | Emb. 2 | Emb. 3 | Emb. 4 | Emb. 5 |
| (1-1) | f2/f | 0.89 | 0.72 | 0.81 | 0.75 | 0.71 |
| (1-2) | f3/f | 0.85 | 0.77 | 0.54 | 0.77 | 0.88 |
| (1-3) | thi_max/oal | 0.09 | 0.10 | 0.09 | 0.16 | 0.02 |
| (2) | \|f1\|/f | 1.31 | 0.98 | 1.06 | 0.97 | 0.72 |
| (3) | \|f4\|/f | 1.02 | 0.91 | 0.55 | 1.00 | 0.94 |
| (4) | thiG1G2/oal | 0.0194 | 0.0160 | 0.0151 | 0.0145 | 0.0215 |
| (5) | allthi/f | 1.25 | 1.25 | 1.25 | 1.31 | 1.66 |
| (6) | f 567/f | 3.76 | 4.82 | 2.79 | 5.94 | 10.73 |
| (7) | R7/f | 0.31 | 0.33 | 0.32 | 0.29 | 0.33 |

What is claimed is:

1. An imaging optics comprising, in sequence starting from the object side, of a 1st lens with a negative refractive power, a 2nd lens with a positive refractive power, a 3rd lens with a positive refractive power, and a 4th lens, a 5th lens, a 6th lens, and a 7th lens with a negative refractive power, satisfying the following conditional expressions $$0.50 \le f2/f \le 1.15 \quad (1\text{-}1)$$

$$0.38 \le f3/f \le 1.10 \quad (1\text{-}2)$$

$$0.015 \le thi\_max/oal \le 0.210 \quad (1\text{-}3)$$

where:
 f: focal length of the imaging optics
 f2: focal length of the 2nd lens
 f3: focal length of the 3rd lens
 thi_max: maximum lens spacing excluding back focal length
 oal: optical length of the imaging optics from the object side surface of the 1st lens to imaging surface
 f567: combined focal length of the 5th lens, the 6th lens, and the 7th lens.

2. The imaging optics of claim 1, wherein the following conditional expression is satisfied $$0.50 \le |f1|/f \le 1.71 \quad (2)$$

where:
 f1: focal length of the 1st lens.

3. The imaging optics of claim 1, wherein the following conditional expression is satisfied $$0.38 \le |f4|/f \le 1.32 \quad (3)$$

where:
 f4: focal length of the 4th lens.

4. The imaging optics of claim 1, wherein the following conditional expression is satisfied $$0.01 \le thiG1G2/oal \le 0.03 \quad (4)$$

where:
 thiG1G2: spacing of the 1st lens and the 2nd lens.

5. The imaging optics of claim 1, wherein the following conditional expression is satisfied $$0.88 \le allthi/f \le 2.15 \quad (5)$$

where:
 allthi: distance from the object side surface of the 1st lens to the image side surface of the 7th lens.

6. The imaging optics of claim 1, wherein the following conditional expression is satisfied $$0.20 \le R7/f \le 0.43 \quad (7)$$

where:
 R7: paraxial radius of curvature of the image side surface of the 7th lens.

7. The imaging optics of claim 1, wherein 1st lens is a biconcave lens.

8. The imaging optics of claim 1, wherein the 2nd lens is a biconvex lens.

9. The imaging optics of claim 1, wherein the object side surface of the 5th lens is a concave surface facing the object side.

10. The imaging optics of claim 1, wherein the object side surface of the 6th lens is a concave surface facing the object side.

11. The imaging optics of claim 1, wherein the 7th lens has a negative refractive power.

12. The imaging optics of claim 1, wherein the image side surface of the 7th lens is a concave surface facing the image side, and has an inflection point not on the optical axis.

13. The imaging optics of claim 1, wherein an aperture stop is disposed between the 2nd lens and the 3rd lens.

14. An imaging device comprising the imaging optics of claim 1 and an imaging element disposed at the imaging position of the imaging optics.

15. An imaging optics comprising, in sequence starting from the object side, of a 1st lens with a negative refractive power, a 2nd lens with a positive refractive power, a 3rd lens with a positive refractive power, and a 4th lens, a 5th lens, a 6th lens, and a 7th lens with a negative refractive power, satisfying the following conditional expressions $$0.50 \le f2/f \le 1.15 \quad (1\text{-}1)$$

$$0.38 \le f3/f \le 1.10 \quad (1\text{-}2)$$

$$0.015 \le thi\_max/oal \le 0.210 \quad (1\text{-}3)$$

$$0.20 \le R7/f \le 0.43 \quad (7)$$

where:
 f: focal length of the imaging optics
 f2: focal length of the 2nd lens
 f3: focal length of the 3rd lens
 thi_max: maximum lens spacing excluding back focal length
 oal: optical length of the imaging optics from the object side surface of the 1st lens to imaging surface
 R7: paraxial radius of curvature of the image side surface of the 7th lens.

* * * * *